TELEPHONE LINE HUNTING SYSTEM

Filed Dec. 28, 1965 5 Sheets-Sheet 1

INVENTOR
E. D. MASUCCI
BY Brendan A. Ward
ATTORNEY

Nov. 18, 1969 E. D. MASUCCI 3,479,465

TELEPHONE LINE HUNTING SYSTEM

Filed Dec. 28, 1965 5 Sheets-Sheet 2

United States Patent Office

3,479,465

Patented Nov. 18, 1969

3,479,465

TELEPHONE LINE HUNTING SYSTEM

Eugene D. Masucci, Columbus, Ohio, assignor to Bell Telephone Laboratories, Incorporated, New York, N.Y., a corporation of New York Filed Dec. 28, 1965, Ser. No. 516,868
Int. Cl. H04m *3/02;* H04q *3/00*
U.S. Cl. 179—18 13 Claims

ABSTRACT OF THE DISCLOSURE

In a telephone switching system, the stations are divided into two groups. The first group consists of stations representing the usual cross-section of classes of service. The second group consists of one block of 100 stations in a PBX group. The directory numbers which are assigned to the individual PBX stations in the second group are also assigned to stations in the first group with the exception of the published PBX group directory number. The marker is arranged to respond to the registration of any called directory number by interrogating the main directory-number-to-equipment - address - translator (number group). If the called directory number is the published number of the PBX group, the main translator is arranged to so inform the marker which thereupon seizes a subsidiary number group and receives therefrom the equipment address corresponding to the directory number of the selected PBX station within the PBX block. Where the called directory number received by the marker does not have related stations served by the subsidiary translator, the main translator is arranged to return the equipment address translation in the usual manner.

Figure 1:
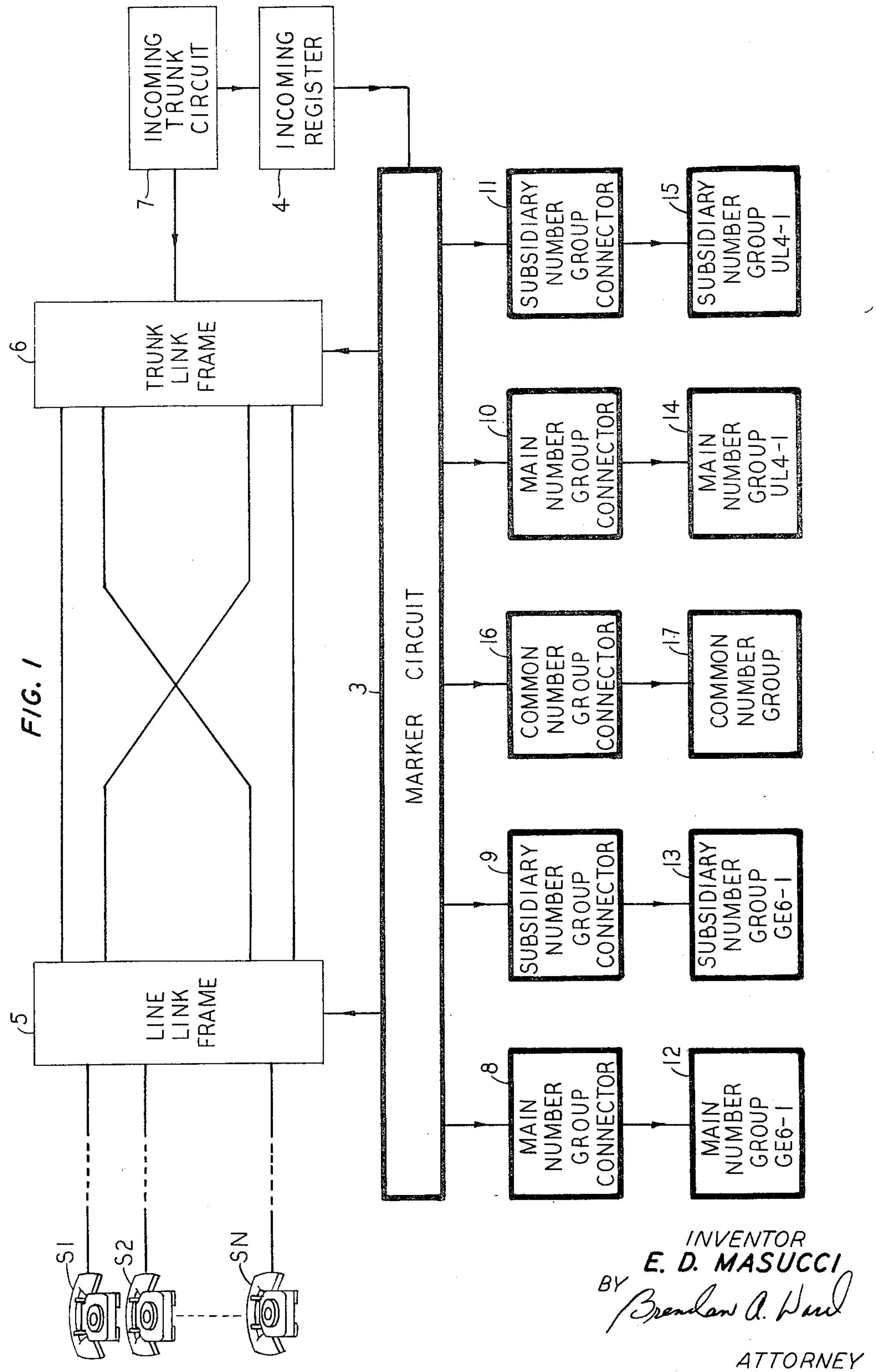

Another aspect of the disclosure is the provision of a single additional number group which is supplementary to all main number groups in the central office and which serves to provide the translation information required for the second line of two-line PBX hunting groups.

This invention relates to telephone systems and particularly to translator arrangements within such systems. More particularly, this invention relates to telephone systems comprising a translator arrangement which permits the repeated assignment of a directory number to diverse telephone stations without conflict.

The early development of automatic telephone systems was greatly facilitated by the preassignment of a unique directory number for each telephone station within the telephone area. However, as telephone stations increased in quantity and telephone areas became larger, the requirement that each station have a unique station address has imposed severe burdens upon telephone plant efficiency and telephone customer convenience. A classic example of the problem is in conjunction with the provision of direct distance dialing (DDD). (See Bell Laboratories Record, vol. 40, March 1952, p. 93 et seq.) In DDD, in order to prevent a conflict between directory numbers, an area code must be prefixed to each transmitted telephone number. In addition, at least two area codes are required within many geographical subdivisions because of the quantity of directory numbers involved. On the surface the problem has appeared to be without solution since, inherently, the ever increasing number of stations requires that directory numbers constantly increase in magnitude. However, upon close analysis it is recognized that certain classes of telephone service utilize a substantial portion of telephone directory numbers. For example, in providing private branch exchange (PBX) service, though only a single directory number is published, numerous other directory numbers are associated therewith within the switching system. These additional numbers are respectively associated with each individual line within the PBX since the majority of switching systems require a one-to-one correspondence between a line appearance and a directory number for translation purposes (see, for example, the A. J. Busch Patent No. 2,585,904 dated Feb. 19, 1952).

In the more recent stored program telephone systems this problem is obviated by programming techniques which permit a single directory number to serve as an address for a large group of PBX lines. (See B.S.T.J. vol. XLIII, Sept. 1964, p. 2533 et seq.). However, at present such systems represent but a minute portion of existing telephone plant.

Accordingly, it is an object of my invention to permit a group of private branch exchange lines to be addressed by a single directory number within a telephone system which does not employ stored programmed techniques.

It is another object of my invention to permit a directory number to be utilized without conflict by more than one telephone station within a telephone area.

It is another object of my invention to provide an arrangement for accomplishing the foregoing objects by an inexpensive expedient which fully utilizes existing equipment.

These and other objects of my invention are attained in accordance with an exemplary embodiment employing an automatic switching system operable to perform terminal hunting over a large group of PBX lines in response to the reception of a called directory number. Each group of 1,000 telephone station line terminals are provided with a main translator capable of translating any one of 1,000 directory numbers into the corresponding line terminal equipment location. An additional subsidiary translator is provided essentially identical to the main translator, responsive to the same digital information as the main translator but operative to provide translation information indicating any one of a totally different 1,000 line terminal equipment locations.

Access by a control circuit during call completion is provided to the main translator in the conventional manner to complete calling connections. However, when the main translator is enabled by a PBX directory number, the output information does not direct the control circuit to an equivalent line location in the usual manner, but rather directs the control circuit to the subsidiary translator where PBX terminal hunting takes place. Thus, in the subsidiary translator, hunting takes place over a group of directory numbers which may also be assigned to non-PBX stations in the main translator. Upon the completion of terminal hunting, an idle line is selected in the usual fashion and the control circuit completes a connection to that line under control of the line equipment information received from the subsidiary translator.

A feature of my invention is a plural translator arrangement which permits the repeated assignment of a directory number to diverse stations.

A further feature of my invention is the provision of a plurality of directory-number-to-line-location translators, each responsive to the same digital information input, but arranged to provide different outputs, in combination with control means operable to selectively enable the particular translator required for a given calling connection.

A further feature of my invention is the employment of existing translators without modification in conjunction with minimal modification in associated control circuitry to accomplish the above set forth features.

In addition to that set forth hereinbefore regarding the problem presented by the ever diminishing availability of directory numbers, an allied problem prevails in the telephone art. The recent provision of numerous special features, such as call-waiting and add-on (see M.E. Krom application Ser. No. 317,930, dated Oct. 22, 1963, now Patent No. 3,320,367, issued May 16, 1967), requires the provision of a second (auxiliary) line appearance for the special service station. For example, in the case of call-waiting, a second line appearance is required because, if the first line is busy, the connection is completed to the second appearance of the station by a technique that closely parallels PBX terminal hunting.

The H. S. Bean et al. application Ser. No. 300,369, filed Aug. 6, 1963, now Patent No. 3,278,692, issued Oct. 11, 1966, disclosed an improved arrangement for accomplishing this hunting function. In essence, the Bean et al. arrangement provides that, upon interrogation of the directory - number - to - line - location translator (number group), the major common control circuit (the marker), receives the equipment location of the called line appearance plus the units digit of the auxiliary line appearance directory number. If the marker finds the called line busy, the numerical designation which is equivalent to the directory number of the auxiliary appearance is formed by replacing the units digit of the originally called number with the units digit provided by the number group. The number group is thereupon reinterrogated to provide the line equipment location of the auxiliary line appearance. A call is then completed to the auxiliary appearance in the conventional fashion.

Although the Bean et al. arrangement is a significant advancement in the art, the arrangement is employed most efficiently only where the two lines have identical directory numbers except for the units digit. Thus, for example, if 10 consecutive directory numbers in a particular tens block are already assigned and one of the respective subscribers desires a sequentially numbered second line, the Bean et al. arrangement may not be utilized.

An identical situation results where a subscriber desires two-line PBX service in place of prior conventional single line service. Although both lines are represented by the same published directory number as far as subscribers are concerned, for the telephone system equipment to function each of the two lines must be assigned a different numerical designation within the telephone system. Thus, if all 10 of the lines in the particular tens block are already assigned, any of the respective subscribers associated with that tens block may not economically have the benefit of the Bean et al. arrangement in connection with the provision of PBX service or special service features.

Accordingly, it is a further object of my invention to provide an economical, efficient and flexible arrangement which permits the Bean et al. arrangement to be employed even though a telephone station is assigned a line in a tens block which is fully utilized.

It is a further object of my invention to permit a customer station which requires an auxiliary line appearance to utilize such line appearance without requiring the assignment of an additional directory number.

These and other objects of this aspect of my invention are attained in accordance with an exemplary embodiment employing an automatic telephone switching system of the type set forth in the Bean et al. application. An additional number group translator is provided in the system which is supplementary to all of the number group translators presently in the central office. The existing number groups each provide an alternative units digit (in addition to the initially called line location) if the customer whose directory number has been dialed is provided with a second line. As in the Bean et al. arrangement, the hundreds and tens digits are reused in conjunction with the units digit supplied by the first number group translation to identify the second line. However, the same number group is not reinterrogated. Instead, the newly formed numerical designation is used to interrogate the supplementary number group translator. This latter number group provides the equipment location of the alternative line. Thus, for example, the newly assembled second line numerical designation may constitute the number "1235." This number is used to interrogate the supplementary number group even though the number "1235" has already been assigned to a totally different line appearance in the original number group. It will be obvious from that which is contained hereinafter that, although only one additional number group is added to the office in the embodiment, as many as are required by the customers' needs may be provided.

It is an additional feature of my invention that a supplementary common translator is provided in a telephone system to permit a telephone station to be associated with a second line appearance without prior reservation of a given directory number.

It is another feature of my invention to permit the repeated assignment of a directory number within a telephone central office.

The foregoing objects and features of the present invention, as well as others, will be apparent from the subsequent description of the exemplary embodiment shown in the drawing, in which:

FIG. 1 is a block diagram of the interrelation of the component elements of the exemplary embodiment; and FIGS. 2 through 5 show in more detail the relationship of the various components disclosed in the embodiment.

Figure 2:
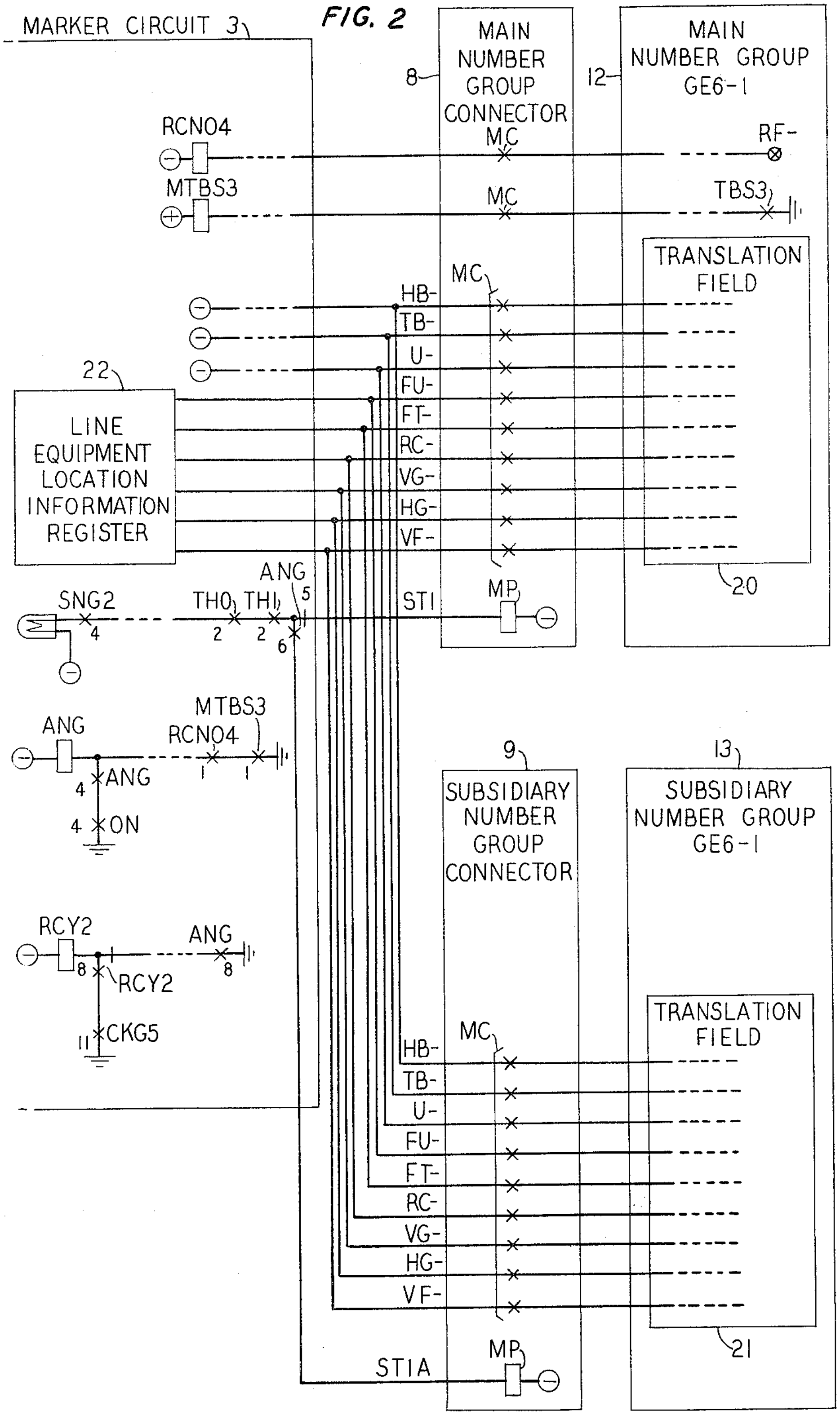
Figure 3:
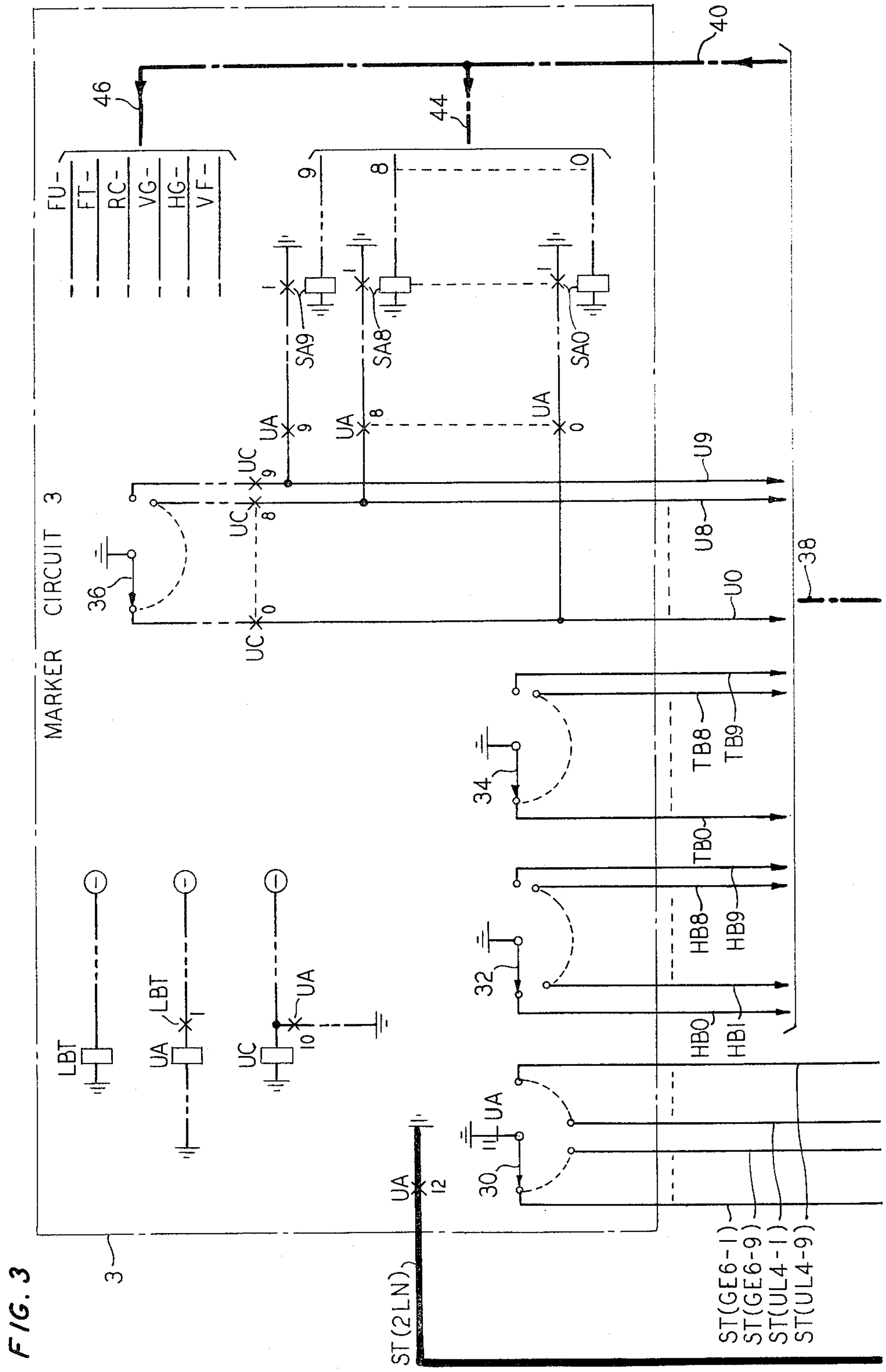
Figure 4:
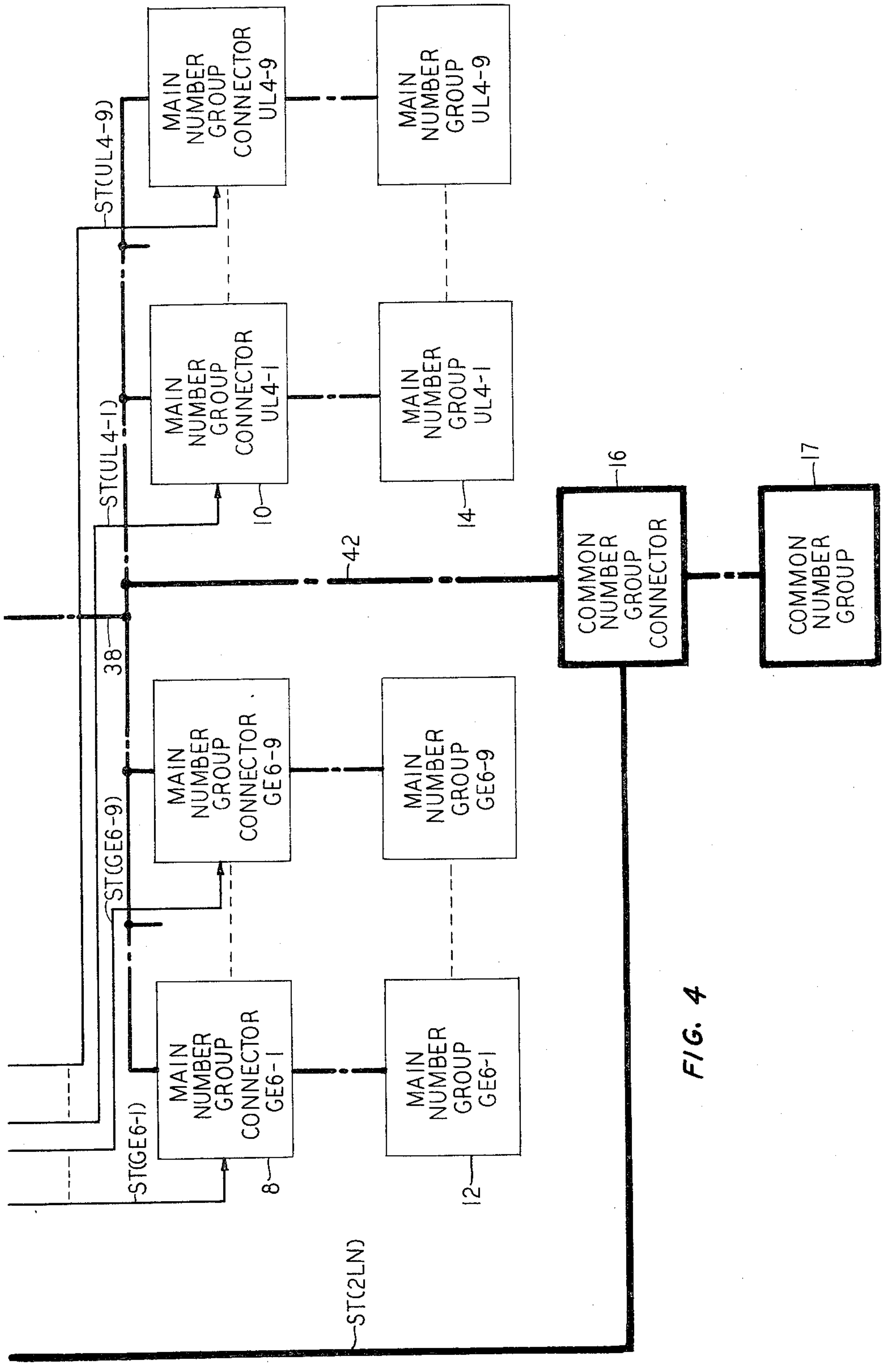

It will be noted that FIGS. 2 through 4 employ a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

The present invention may advantageously be embodied in an automatic switching system of the type disclosed in the A. J. Busch Patent No. 2,585,904, dated Feb. 19, 1952. It is to be understood, however, that my invention is not limited to use in a system of this type, but may be used in any automatic switching system.

The invention described herein is particularly concerned with apparatus in marker circuit 3 and number group circuits 12 through 15 and 17, and the associated number group connectors, all of which are represented by the blocks shown with heavy lines in FIG. 1. The other equipment units are neither shown nor described in detail except where necessary for a complete understanding of the invention. The Butch patent and the priorly cited H. S. Bean et al. application may be consulted for a more complete understanding of the construction and operation of components not covered in detail herein.

INTRODUCTION

Referring briefly to FIG. 1, as described in detail in the Busch patent, in order to complete a calling connection to a subscriber station, such as S1, S2, or SN, the marker must translate the called directory number into the line appearance location information of the respective station on line link frame 5. In the following description it will be assumed that the marker circuit is in the process of completing a calling connection which has originated via incoming trunk circuit 7 from another central office. It will be obvious from that which is contained hereinafter that the pertinent circuit operation is essentially identical for other calling connections originating within the central office.

As set forth in the Busch patent, when an incoming trunk circuit, such as incoming trunk circuit 7, is activated, an incoming register, such as incoming register 4, is connected thereto to receive the called directory number. Upon receiving this information, the register seizes a marker, such as marker circuit 3, and forwards the called directory line numerals to that circuit for processing. Upon interrogating a number group utilizing the called line directory number, the marker receives the equipment location of the called station and thereupon completes a linkage connection from the appearance of incoming trunk circuit 7 on trunk line frame 6, via line link frame 5 to the appropriate station such as station S1.

In the following description we shall be concerned only with the manner in which the marker and number group circuits cooperate in employing my invention. All other circuit operation is described in detail in the aforesaid Busch patent which is hereby made a part of this specification as though contained in detail herein.

GENERAL DESCRIPTION

PBX hunting via a subsidiary number group associated with a main number group For purpose of the embodiment we shall assume that among the stations served by marker circuit 3 there exists a PBX group of lines designated by the published directory number GE6–1100. We shall further assume that this PBX group comprises 100 stations. Accordingly, as described in the Butch patent, the directory numbers reserved and utilized for this PBX constitute the sequential group of numbers from GE6–1100 through GE6–1199. The following description will disclose the manner in which this block of directory numbers is utilized both for the PBX group and also for a group of diverse stations not associated with the PBX.

Referring briefly to FIG. 1, upon recognizing that the called line directory number constitutes numbers in the 1,000 series for the GE6 office, the marker seizes main number group GE6–1 via number group connector 8 as set forth in detail in the Busch patent. In the instant arrangement, however, the number group output which is transmitted to the marker causes the marker to recycle and select subsidiary number group GE6–1. As before, the marker circuit requests a translation utilizing the called directory number as an input. At this time, however, the number group indicates to the marker that the line constitutes a PBX hunting group. Accordingly, PBX hunting takes place over the block of numbers extending from 1100 through 1199 in subsidiary number group GE6–1 so as to find an available line in a manner identical to that set forth in the Busch patent. We shall assume that the only presently idle line is designated 1199. Accordingly, the line equipment location of this line, as indicated by subsidiary number group GE6–1, is returned to the marker and the connection is completed thereto, whereupon the marker releases.

We shall now assume another incoming connection substantially identical to the priorly described connection with the exception that the marker initially receives the called line numerals GE6–1199. Upon interrogating main number group GE6–1, as set forth in the Butch patent, the marker receives the calling line equipment location information directly as set forth in the Butch patent. A connection is thereupon completed to the line location indicated by the main number group, whereupon the marker releases.

It will thus be obvious from the foregoing general description that directory number GE6–1199 is effective to yield two independent translations, first in the subsidiary number group GE6–1, and once again in main number group GE6–1. No conflict exists within the system between the stations respectively designated by the same directory number in view of the fact that the main number group provides a direct translation for a particular directory number only where such number is initially dialed. On the other hand, where a PBX directory number is dialed, the main number group directs the marker to hunt over a group of priorly assigned directory numbers in the subsidiary number group.

Although the foregoing description concerns itself only with the completion of calling connections, it may be noted that the arrangement is equally effective in the case of originating calls, which, of course, do not require a directory number to line location translation in establishing the connection. No conflict exists between the independent lines designated by the same directory number in view of the fact that billing is based upon calling line equipment location, which is, of course, distinct. In addition, where such calling line equipment location information is subsequently translated into a directory number, the translator may be arranged, employing techniques well known in the art, to indicate the published PBX telephone number for all originating calls involving PBX line locations.

DETAILED DESCRIPTION

Subsidiary number group associated with a main number group

Referring now to FIG. 2, we shall assume at this point that the marker has received the called line PBX number GE6–1100 and accordingly, as explained in detail in the Busch patent, has operated the MP relay of the main number group connector 8 via the ST1 lead. It may be noted that the ST1 lead extends through a released break contact on the ANG relay, the purpose of which will be obvious subsequently.

Upon the operation of relay MP, main number group GE6–1 is seized as set forth in detail in the Busch patent. The resultant operation of relay MC in the main number group connector 8 closes through the necessary information leads between the marker and the number group. The marker thereupon forwards the called number hundreds, tens and units digit to the number group via the respective HB-, TB- and U-conductors. As further disclosed in detail in the Busch patent, the number group returns the calling line location to the marker in terms of the line link frame units number (FU-lead), line link frame tens number (FT-lead), ringing combination (RC-lead), vertical group (VG-lead), horizontal group (HG-lead), and vertical file (VF-lead).

The instant embodiment requires that an additional bit of information be returned by the number group. Accordingly, the instant embodiment may advantageously incorporate means for providing additional translation indications from the number group which do not necessitate the provision of additional conductors. Such an arrangement is disclosed in detail in application Ser. No. 240,558 filed on Nov. 28, 1962 by T. V. Burns et al., now Patent No. 3,264,415, issued Aug. 2, 1966. This arrangement is disclosed generally in column 11, lines 26 through 70; and is disclosed in detail in column 13, line 22 et seq. of that patent. Accordingly, that portion of the Burns et al. application is made a part of this specification as though repeated in detail herein. It will be evident from that which is contained hereinafter that, though the instant invention may be facilitated by employing such an arrangement, the invention is not dependent thereon.

Accordingly, employing this arrangement relays RCNO4 and MTBS3 operate at this time. The operation of these relays complete the obvious operate path of the ANG relay in marker circuit 3. As will be apparent from that which is contained hereinafter, marker circuit 3 is thus advised to interrogate subsidiary number group GE6–1 in order to obtain the called line equipment location information.

The enabling of make contact 8 of relay ANG completes the obvious operate path of relay RCY2 which, as set forth in detail in the Bean et al. application, causes the marker to recycle. As described therein in detail, recycling of the marker is constituted by the release of a portion of the priorly registered information so as to place the marker in essentially the same position as it was prior to number group seizure. Accordingly, upon the completion of the recycle function, battery is extended to subsidiary number group 9 ST1A lead via an obvious circuit path which extends through operated make contact 6 on the ANG relay thus operating marker preference relay MP in subsidiary number group connector 9.

As described hereinbefore, the enabling of the number group connector results in the extension of a plurality of leads between subsidiary number group GE6–1 and marker circuit 3. As set forth in detail in the Busch patent, in view of the fact that the dialed directory number constitutes a PBX hunting group, PBX hunting takes place over the 100 lines involved, thus extending from GE6–1100 through GE6–1199. The first idle line within that group is selected as set forth in the Busch patent and the line equipment location information pertinent thereto is returned to line equipment location information register 22 via the FU-, FT-, RC-, VG-, HG-, and VF-leads. As further set forth in the Busch patent, the marker thereupon releases the number group and establishes a connection between the calling trunk and the idle called line.

Digressing momentarily, it is, of course, obvious that upon the marker receiving a called line directory number such as GE6–1101 translation takes place directly in main number group GE6–1 as set forth in the Busch patent. It is also obvious, of course, that GE6–1101 may also designate a distinct PBX hunting group arranged for terminal hunting within the main number group GE6–1.

Common number group

Referring again to FIG. 1 we shall assume that marker 3 serves two office codes, GE6 and UL4, and that accordingly, 20 number groups are provided, 10 for each office code. (For simplicity of illustration only one main number group for each office is shown on FIG. 1). As earlier described, each number group is capable of translating 1,000 four-digit numbers into respective line equipment locations. In the embodiment, we shall further assume that a single common number group 17 is provided which is accessible to the marker via common number group connector 16.

Referring now to FIGS. 3 and 4, after seizing number groups GE6–1, as priorly described, the marker energizes conductor HB1, in accordance with the hundreds digit of the dialed number, by application of a ground potential. This operation is shown symbolically by wiper 32. Similarly, wiper 34 causes conductor TBO to be energized in accordance with the dialed tens digit. The units digit is transmitted by the ground potential appearing on the U1 conductor (not shown) via wiper 36.

The 30 conductors HB-, TB-, and U- are extended via cable 38 to each of the 20 number group connectors. As set forth in the Busch patent, while the system may include numerous number group connectors only one of these operates during any translation. Thus, in the instant case the office code and the thousands digit of the dialed number causes main number group connector GE6–1 to function.

In the Bean et al. system, when one of the number group connectors is first selected responsive to the dialed directory number, relay UC is operated in the marker. With contacts UC–0 through UC–9 closed, ground potential is extended to one of the 10 units conductors in accordance with the operation of wiper 36. This wiper operates (symbolically) in accordance with the dialed units digit. The hundreds, tens and units digits of the dialed number are extended to the selected number group and, in accordance with the wiring in the number group, various signals are extended back to the marker over cable 40. As earlier described, the system includes FU-, FT-, RC-, VF-, HG- and VG-conductors (cable 46). These conductors transmit the line equipment location information associated with the dialed directory number and certain other information, such as a ringing code. In addition, in the Bean et al. system a signal is transmitted over one of the 10 conductors in cable 44 to energize one of the 10 relays SA0–SA9. The operated relay represents the alternative units digit to be used in the next translation if the called line is busy.

If the called line is idle, the connection is completed in the ordinary manner by marker circuit 3. If the line is busy, however, relay LBT operates, and with the closing of contacts LBT–1 relay UA energizes. When contacts UA–10 close, relay UC is prevented from operating. It will be recalled that in the Bean et al. system there are no contacts equivalent to UA–11 and consequently wiper 30 still energizes the same start conductor. Thus, wipers 32 and 34 still transmit the same hundreds and tens digits to the same selected number group. Only the units digit is different. Since contacts UC–0 through UC–9 are now open, the units digit represented by the position of wiper 36, no longer controls the grounding of one of the ten units conductors U0–U9. Instead, contacts UA–0 through UA–9 are closed and enable one of these ten units conductors in accordance with the operated SA0–SA9 relay. For example, if the alternative units digit is an 8, relay SA8 is operated, and conductor U8 is grounded through contacts UA–8 and SA8–1. Thus in the Bean et al. system the same number group is interrogated a second time, the second number differing from the first in only the units digits. The line equipment location of the alternative line is represented by the signals appearing on the conductors in cable 46, and if the alternative line is idle the call is completed to it.

The same type of operation takes place in the case of a two-line PBX and in the case of a subscriber having two lines with the calls-waiting feature. In either case the dialed directory number is translated into a first line equipment location, and if this line is busy the second line is selected. It is apparent that for the Bean et al. system to be most efficient, the two numbers assigned to the PBX or the subscriber must differ in only the units digit, because the second directory number constructed by the marker differs from the dialed number only with respect to the unit digit.

Proceeding now with the description, the aforesaid limitation in the Bean et al. system is obviated, without the use of additional equipment for each subscriber desiring a second line, if the elements shown in heavy outline are added as shown in FIGS. 3 and 4. The system operation on each call is the same as set forth in the Bean et al. disclosure up to the point where relays LBT and UA operate if the called line is busy. At this time one of relay SO0–SA9 is operated and represents the alternative units digit. Thus the three conductors in the HB, TB and U groups which are energized are the same as those which are energized in the Bean et al. patent for assembling the second directory number. In the Bean et al. system, however, it will be recalled that the same number group connector is energized since wiper 20 still grounds the same start (ST) lead. In accordance with my invention, however, when relay UA operates, contacts UA–11 open and the initially energized start lead is no longer grounded. Since contacts UA–11 are open, none of the original number group connectors are enabled.

In addition, when relay UA operates, contacts UA–12 close. Thus start lead ST(2LN) is grounded and common number group connector 16 is selected. Cable 42 extends the 30 HB, TB and U conductors to common number group connector 16. When this connector operates, the aforesaid conductors are extended to common number group 17. The number represented by the dialed hundreds and tens digits and the alternative units digit are translated into the second line equipment location of the called party. The call is then completed to the alternative line as set forth in the Bean et al. application.

It will be noted from the foregoing that the major difference between the Bean et al. system and my invention is that the three-digit number which is assembled and represents the alternative line is used, not to reinterrogate the same number groups, but instead is used to interrogate a common number group which is added to the system. This allows a second line to be assigned to a subscriber even though all of the directory number in the respective tens block are already assigned and further allows a second line to be assigned to a subscriber even though all of the directory numbers in the respective 10,000 number unit (GE6 or UL4 in this example) have been priorly assigned.

Figure 5:
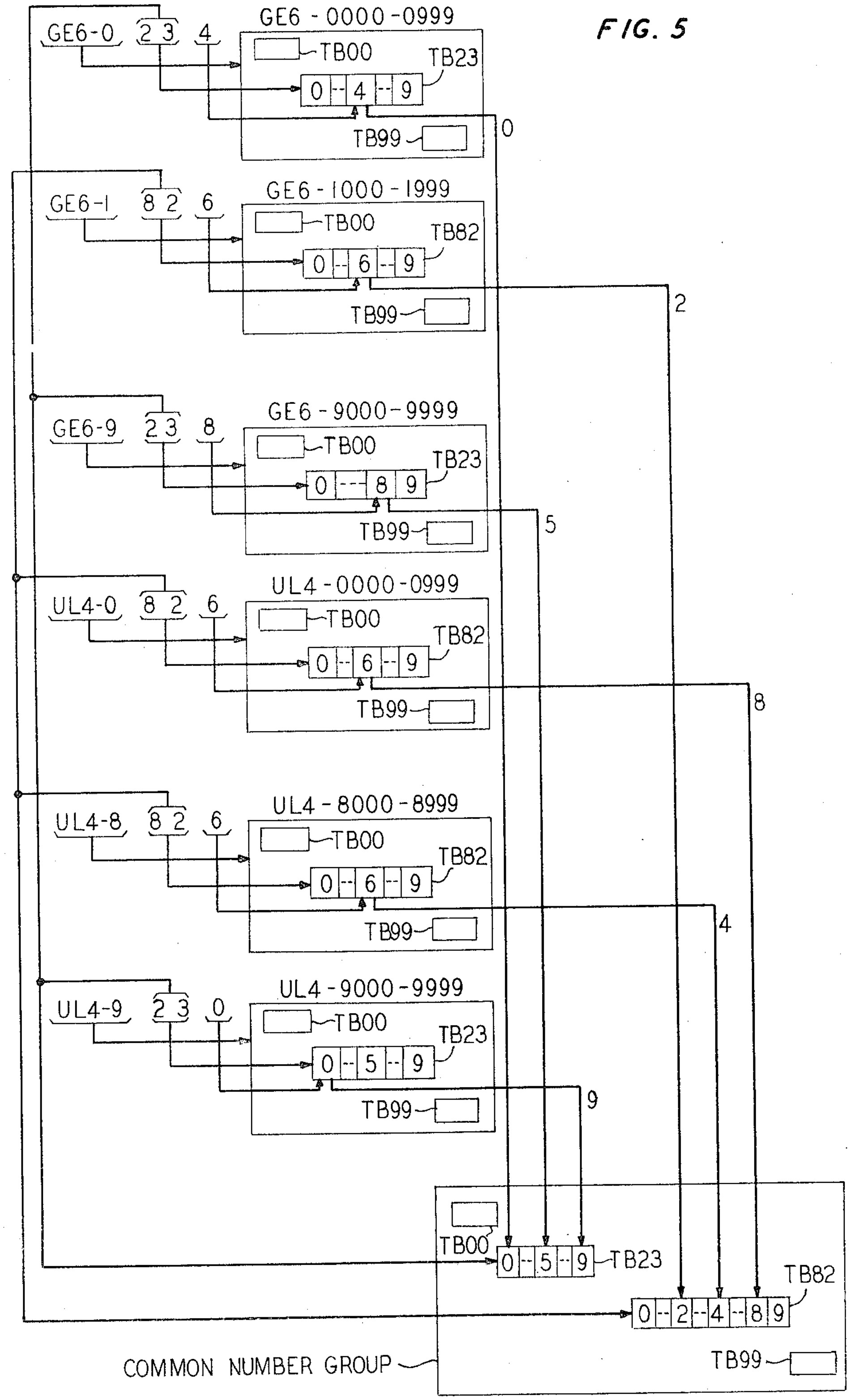

This will become even more apparent if FIG. 5 is examined. FIG. 5 shows the 20 first line number groups and the single common number group shared by them all. Each of the 21 number groups includes 100 tens blocks and each is thus capable of translating 1,000 different three-digit numbers into respective line equipment locations. Consider, for example, the GE6–0 number group shown at the top of FIG. 5. This number group includes 100 tens blocks, of which only three are shown, and of which only one is shown in any detail. Suppose the dialed directory number is GE6–0234. The GE6–0 part of the number causes the selection of the GE6–0 number group. The 23 part of the dialed number causes tens block TB23 in this number group to be selected, and the four in the dialed number selects position 4 in this tens block. The output of the number group consists of a first line translation (the line equipment location associated with the dialed number and the alternative units digit 0). If the first line is not busy, the alternative units digit is not required. If the first line is busy, however, the alternative units digit 0 is used to interrogate position 0 in the same tens block TB23 in the common number group.

Thus, for the second translation, the common number group is always selected and consequently it is only necessary to define a particular one of the 100 tens block in this number group and a particular poistion in this block to derive the second line translation. The particular tens block in the common number group is selected in accordance with the hundreds and tens digits in the original dialed number GE6–0234. Just as these digits caused tens block TB23 to be selected in number group GE6–0, they cause tens block TB23 in the common number group to be selected when this number group is interrogated. With tens block TB23 in the common number group selected by the dialed hundreds and tens digits and with the 0 position in this number group selected by the alternative units digit, the line equipment location of the second line is derived.

The system operations, when the other five directory numbers shown in FIG. 5 are dialed, are similar and are self-explanatory in view of the foregoing. In each case the initially received hundreds and tens digits are used to identify a particular tens block in the common number group and the alternative units digit is used to identify a particular position in this block. The alternative units digits are all shown adjacent the vertical lines directed to particular positions in tens block TB23 and TB82 in the common number group.

The advantages of this aspect of my invention are now apparent. Suppose that the ten directory numbers in tens block TB82 in the GE6–1 number group are all assigned to respective subscribers and the subscriber whose directory number is GE6–1826 requires a second line or two-line PBX service. In the Bean et al. system the number group may be arranged to provide an alternative units digit but since the same tens block would be reinterrogated to derive the second line equipment number, the subscriber cannot be assigned a second directory number in the group of ten since the other nine numbers are already assigned. Consequently, without the provision of additional equipment the mere provision of the alternative units digit is not sufficient to derive the line equipment location of a second line. In the system of my invention, however, additional equipment is not required for each such line. In addition, the unavailability of a directory number in the same tens block or even in the entire office unit does not negate the provision of service in the most economical and efficient manner.

SUMMARY

While the equipment of my invention has been described with reference to a particular embodiment wherein a plurality of translators are arranged to permit repeated assignment of a telephone directory number within a telephone system, it is to be understood that such an embodiment is intended merely to be illustrative of the principles of my invention and that numerous other arrangements may be devised by those skilled in the art without departing from the spirit and scope of the invention.

For example, the invention may be used in a switching system arranged to interconnect teletypewriters, data processing equipment, or similar system stations.

What is claimed is:

1. In a communication system, a main translator serving a group of stations and responsive to an input comprising a station address for identifying a station in said group, a subsidiary translator serving another group of stations and responsive to said same station address input for identifying a station in said other group, control means responsive to registration of any called station address for interrogating said main translator, and means in said main translator responsive to certain said called station addresses for directing said control means to interrogate said subsidiary translator.

2. In a communication system, first and second means each responsive to a digital code input for providing an equipment address output, a plurality of stations and a main station each assigned an individual digital code another station assigned a digital code identical to the code assigned to one of said plurality of stations, said first means responsive to said identical digital code for providing the equipment address of said other station, said second means responsive to said main station digital code for providing the equipment address of one of said plurality of stations, and means controlled by said first means responsive to said main station digital code for enabling said second means.

3. In a telephone system, a first and a second translator each responsive to a numerical designation input for providing an equipment address output, a plurality of PBX stations each assigned an individual numerical designation including a main numerical designation, a non-PBX station assigned a numerical designation identical to a first one of said PBX stations, said first translator responsive to said identical numerical designation for providing the equipment address of said non-PBX station, said second translator responsive to said main numerical designation for alternatively providing the equipment address of one of said PBX stations, and
means controlled by said first translator responsive to said main numerical designation for enabling said second translator.

4. In a telephone system,
a main translator serving a group of numerical designations and responsive to an input comprising a numerical designation in said group for identifying a line associated with said numerical designation,
a subsidiary translator serving an identical group of said numerical designations and responsive to said numerical designation input for identifying a different one of said lines,
control means responsive to registration of a called numerical designation for interrogating said main translator, and
means controlled by said main translator output for inhibiting further interrogation of said main translator and for enabling interrogation of said subsidiary translator.

5. In a telephone system,
a PBX station and a non-PBX station each having the same numerical designation,
another PBX station having a unique numerical designation,
a first translator responsive to said same numerical designation for providing the equipment address of said non-PBX station,
a second translator responsive to said unique numerical designation and controlled by the idle state of said PBX stations for providing the equipment address of either said PBX station, control means for enabling each said translator, and
means in said first translator responsive to said unique numerical designation for directing said control means to enable said second translator.

6. In a telephone system,
a first station and a second station each having a unique equipment address and a common station address,
another station having a unique equipment address and a unique station address,
a first translator responsive to said common station address for providing the equipment address of said first station,
a second translator responsive to said unique station address for alternatively providing the respective equipment address of said second station and said other station,
means for enabling said first translator,
means for enabling said second translator, and
means in said first translator responsive to an input comprising said unique station address for enabling said second translator enabling means.

7. In a telephone system,
a plurality of line terminals each having a unique equipment address,
a pair of said line terminals having a common numerical designation,
first translating means for providing the equipment address of a first one of said pair of terminals in response to an input comprising said numerical designation,
second translator means for providing the equipment address of the other one of said terminals in response to an input comprising said numerical designation and
control means for enabling said first translator means only in response to the reception of said numerical designation from a source external to said control means, and
means for enabling said second translator means in response to the formation of said numerical designation within said control means.

8. A telephone system comprising a plurality of lines,
a main translator serving a group of numerical designations and responsive to a called numerical designation in said group for identifying a first line associated with said called numerical designation and for supplying an alternative digit,
means for registering said alternative digit,
means responsive to the busy condition of said first line for assembling another numerical designation by replacing a digit in the called numerical designation with the said alternative digit,
a subsidiary translator responsive to said assembled numerical designation for identifying an alternative line, and
means for establishing a connection to said alternative line.

9. A telephone system in accordance with claim 8 wherein the digits of said assembled numerical designation are identical to those of a numerical designation served by said main translator, and further including means enabled by said assembling means for inhibiting said main translator and for enabling said subsidiary translator.

10. In a telephone system having a plurality of lines,
a plurality of number group circuits each serving a respective group of numerical designations and each responsive to an interrogation with a dialed numerical designation in the respective group for identifying the line associated with said dialed numerical designation preparatory to establishing a connection thereto and for registering an alternative units digit,
means responsive to an identified line being busy for forming an alternative numerical designation from some of the digits in said dialed numerical designation and the alternative units digit supplied by the interrogated number group circuit, and
means for reinterrogating the same number group circuit with said formed designation to identify an alternative line preparatory to establishing a connection thereto;
the improvement comprising an additional number group circuit, and
means responsive to said first line being busy for inhibiting the reinterrogation of the same number group circuit and for interrogating said additional number group circuit with said formed designation to identify an alternative line preparatory to establishing a connection thereto.

11. A telephone system comprising a plurality of lines,
first translating means for translating a called numerical designation into a first line equipment location and an alternative numerical designation digit,
means for forming an alternative number from some of the digits in said called numerical designation and said alternative digit,
second translating means for translating said formed number into a second line equipment location, and
means responsive to a called numerical designation for operating said first translating means and if said first line equipment location is busy for thereafter operating said second translating means.

12. A telephone system in accordance with claim 11 wherein said alternative number which is formed consists of the hundreds and tens digits in said called numerical designation and said alternative digit, and further including means for preventing the forming of said alternative number if said first line equipment location is idle.

13. A telephone system comprising a plurality of lines;
a first plurality of means for translating a called numerical designation into a respective first line equipment location and for supplying additional digital information;
a second lesser plurality of means for translating a number, formed from some of the digits in any said called numerical designation and said digital information supplied by one of said first translating means, into a second line equipment location; and means responsive to a called numerical designation for operating one of said first translating means, for establishing a connection to said first line equipment location if it is idle, for operating one of said second translating means if said first line equipment location is busy, and for thereafter establishing a connection to said second line equipment location.

No references cited.

KATHLEEN H. CLAFFY, Primary Examiner

T. W. BROWN, Assistant Examiner